(12) United States Patent
Sinnott, Jr.

(10) Patent No.: US 6,421,657 B1
(45) Date of Patent: Jul. 16, 2002

(54) METHOD AND SYSTEM FOR DETERMINING THE LOWEST COST PERMUTATION FOR JOINING RELATIONAL DATABASE TABLES

(75) Inventor: Joseph Sinnott, Jr., Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/332,586

(22) Filed: Jun. 14, 1999

(51) Int. Cl.$^7$ .............................................. G06F 17/30
(52) U.S. Cl. .............................................. 707/2; 707/3
(58) Field of Search ................................. 707/2, 3, 4, 5

(56) References Cited

U.S. PATENT DOCUMENTS

| | | | | |
|---|---|---|---|---|
| 5,345,585 A | * | 9/1994 | Iyer et al. ....................... | 707/2 |
| 5,666,525 A | | 9/1997 | Ross ............................... | 707/2 |
| 5,671,403 A | * | 9/1997 | Shekita et al. .................. | 707/3 |
| 5,802,357 A | | 9/1998 | Li et al. ......................... | 707/2 |
| 5,822,749 A | * | 10/1998 | Agarawal ....................... | 707/2 |
| 6,205,441 B1 | * | 3/2001 | Al-omari et al. ............... | 707/2 |

* cited by examiner

*Primary Examiner*—Diane D. Mizrahi
(74) *Attorney, Agent, or Firm*—Sawyer Law Group LLP; Ingrid M. Foerster

(57) ABSTRACT

A method and system for calculating the lowest cost join permutation for queries which involve multiple database tables is disclosed. A method and system comprises building all initial table composites and determining the cost of building each member of the set of composites one table at a time. The method and system includes comparing the cost of building each member of the composites to a threshold value and skipping any member of the set of composites that has a value greater than the threshold value. The method and system includes calculating the cost of building all possible members of the next successively larger set of composites which can be built from members which do not exceed the threshold value and saving the lowest cost means for building each member of the next successively larger composites. The method and system includes determining if a final composite has been built and stepping to the next composites if the final composite has not been built. Finally, the method and system includes repeating the above until the final composite has been built. The costs of building a given composite are compared to a threshold. The threshold is determined by choosing a minimum cost composite from all the composites which have N tables in them. The costs of adding each missing table, one at a time, to this composite are calculated until the full N-table composite has been "built". The minimum cost of building the N-table composite is the threshold. The threshold value is recalculated each time the successively larger set of composite tables has been built. If any new calculation results in a lower threshold value, the newer value replaces the current threshold value.

12 Claims, 4 Drawing Sheets

METHOD AND SYSTEM FOR DETERMINING THE LOWEST COST PERMUTATION FOR JOINING RELATIONAL DATABASE TABLES

FIELD OF THE INVENTION

The present invention relates to database management systems for use with data processors, and more particularly toward optimizing the computer-implemented process of retrieving data from databases.

BACKGROUND OF THE INVENTION

Enterprises typically store large amounts of data in computer database systems using database management system (DBMS) software to access the data. A relational database management system (RDBMS) logically organizes the data into relations. A relation can be thought of as a table where each row is a tuple and each column is a component of the relation designing an attribute.

Data can be extracted by querying the database for all tuples in a relation that meet a certain criteria. A join operation is performed to connect data from two or more relations wherein tuples with matching attributes are joined to form a new tuple. A join order is the order in which join operations are performed. A join method is a technique for performing the join of two relations.

A query language provides a set of commands for storing, retrieving and deleting data. The query languages for relational database management systems do not require users to specify the manner in which data needs to be accessed. Rather, query optimization algorithms in the database management systems select the manner in which queries will be processed.

For large databases, the manner used by a database management system to process a query has to provide access to data in a reasonable period of time in order to accommodate database users needing data to be retrievable without excessive delay.

There are three problems solved concurrently by a query optimizer in a relational database system when processing a query for retrieving data. The first problem is the selection of the access method to access each table specified in the query. This problem can be solved in linear time as a function of the number of relations in the query since the access method selection only involves examination of each available access method for each table.

The other two problems to be solved by the query optimizer are the selection of the order in which to join relations or tables in the query, the join order, and the selection of the method to be used for each join operation joining relations. A join plan comprises a join order scheme for joining the relations and a join method scheme of join methods to be used for each join operation. The solutions for these two problems, i.e., providing a good join plan, are complicated and require polynomial time solutions.

There are two practical procedures for selecting optional join orders and methods that are currently used in relational database software products and there are other solutions that have been proposed in the literature. However, all of the known procedures have shortcomings of not finding a good joint plan or requiring too much programming time and too much space of memory.

The "Dynamic Programming Algorithm" is currently used in many RDBMS products and is described in P. G. Selinger, M. M. Astrahan, D. D. Chamberlin, R. A. Lorie and T. G. Price, "Access Path Selection in a Relational Database Management System", in *Proceedings of the ACM-SIGMOID International Conference on Management of Data*, 1979, at pages 23–24. The Dynamic Programming Algorithm uses the iterative construction of a search tree to join R relations. First, the best way is found to join every pair of relations that is linked by a join predicate. Next, the best way to join composites of three relations is found by considering for each relation the best way to join it with each pair of relations joined as saved earlier in storage. This process continues for the composites of four relations and so on. Finally, a plan to join the R relations is found which can be implemented in a minimal amount of time. At each stage, the best plans are saved for every interesting order. An interesting order is the order defined by any join column.

The Dynamic Programming Algorithm is very complex in terms of memory and time. The number of solutions that must be stored for the worst case is $O(N2^R)$, where N is the number of interesting orders. The worst case time complexity has the same order. For any particular query, the complexity depends on the connectivity of the query graph.

Experiments have shown that the time and memory used by the Dynamic Programming Algorithm are unacceptable for queries involving large numbers of tables, especially on processors with small memories. Database users generally prefer to pose larger join queries than permitted in current database systems; these system are often constrained by the limitations of the Dynamic Programming Algorithm. Therefore, while dynamic programming tends to be accurate in producing optimal join order and method selections, the time and memory constraints create a problem for most users. The cost of a given plan is based on the amount of time required to process a given query using a join plan. For some queries that will be performed hundreds of times, it is worthwhile to use the Dynamic Programming Algorithm to obtain a join plan that can be performed quickly. However, for other queries, it is not worth the time of using such an expensive algorithm.

The excessive time and space complexity of the Dynamic Programming Algorithm has motivated the development of algorithms that have polynomial time and memory complexity while still producing good join orders. These algorithms do not typically have the shortfalls of Dynamic Programming Algorithm in terms of time and memory complexity. However, these algorithms typically do not produce join plans that can be implemented as fast as the plans produced by the Dynamic Programming Algorithm.

A number of optimization algorithms have been proposed that use randomization, such as the Iterative Improvement and Simulated Annealing algorithms. However, these algorithms do not provide optimal join processing with non-complex time and memory requirements.

Accordingly, what is needed is a system and method for determining the lowest cost permutation for joining relational database tables. The present invention addresses such a need.

SUMMARY OF THE INVENTION

A method and system for calculating the lowest cost join permutation for queries which involve multiple database tables is disclosed. A method and system comprises building all initial table composites and determining the cost of building each member of the set of composites one table at a time. The method and system includes comparing the cost of building each member of the composites to a threshold value and skipping any member of the set of composites that has a value greater than the threshold value. The method and system includes calculating the cost of building all possible members of the next successively larger set of composites which can be built from members which do not exceed the threshold value and saving the lowest cost means for building each member of the next successively larger composites. The method and system includes determining if a final composite has been built and stepping to the next composites if the final composite has not been built. Finally, the method and system includes repeating the above until the final composite has been built.

In the present invention, the costs of building a given composite are compared to a threshold. The threshold is determined by choosing a minimum cost composite from all the composites which have N tables in them. The costs of adding each missing table, one at a time, to this composite are calculated until the full N-table composite has been "built". The minimum cost of building the N-table composite is the threshold. The threshold value is recalculated each time the successively larger set of composite tables has been built. If any new calculation results in a lower threshold value, the newer value replaces the current threshold value.

DETAILED DESCRIPTION

The present invention relates to a method for joining tables in a relational database. The following description is presented to enable one of ordinary skill in the art to make and use the invention and is provided in the context of a patent application and its requirements. Various The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
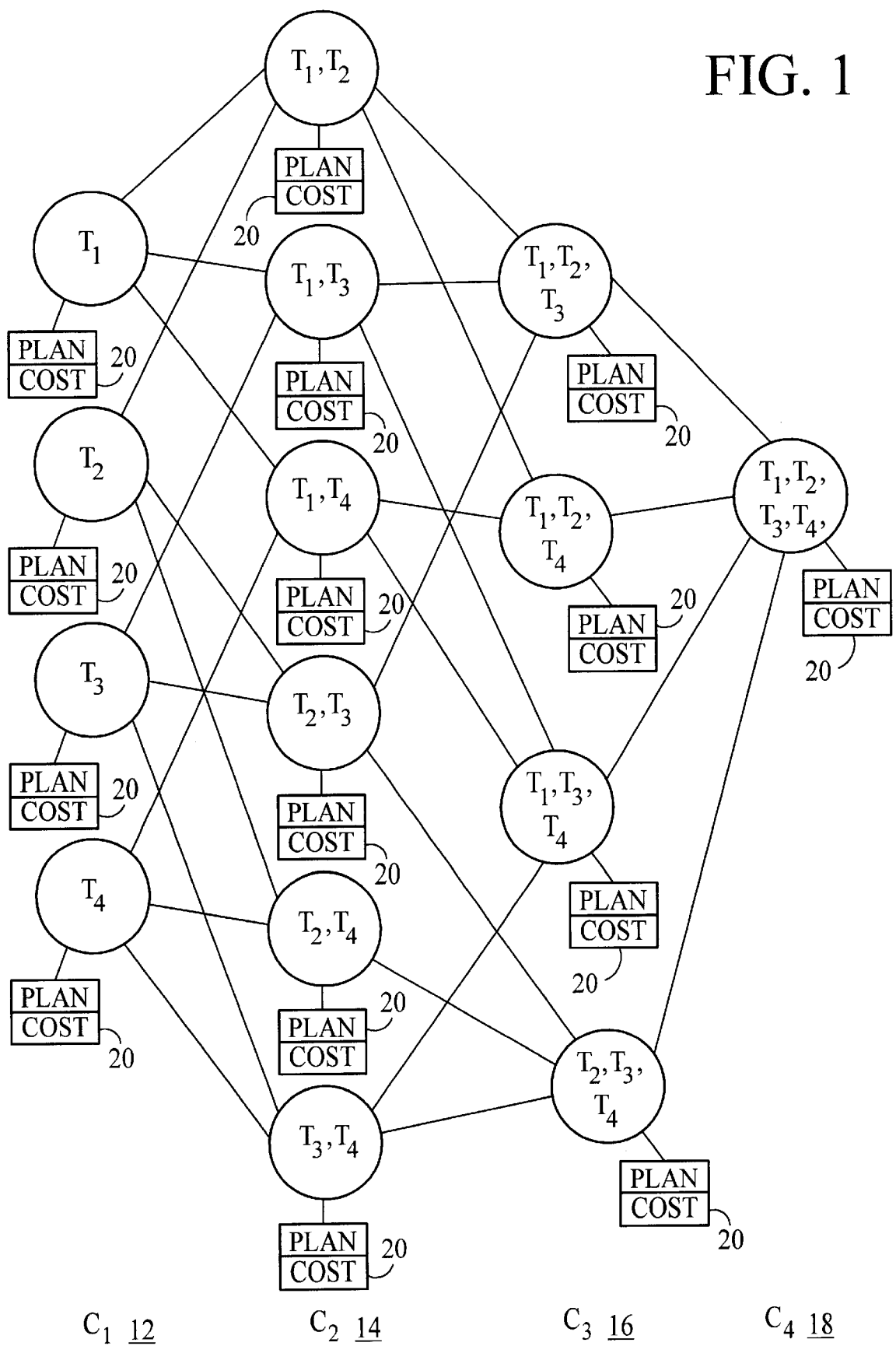
FIG. 1 illustrates an algorithm used to determine the join permutation for the case of four tables $T_1$, $T_2$, $T_3$ and $T_4$.

FIG. 1 illustrates an algorithm used to determine the join permutation for the case of four tables $T_1$, $T_2$, $T_3$ and $T_4$. A join process is utilized to combine tables into composites. As is seen, there are four one table composites 12, six two table composites 14, four three table In composites 16 and one four table composite 18. Each of the composites will include a plurality of members. Associated with each multitable composite is a plan and its associates cost. The plan is the way to build the composite that results in a minimum cost., The associated cost is the cost of executing the plan. The following definitions will be utilized to describe the operation of the algorithms for joining tables.

Figure 2:
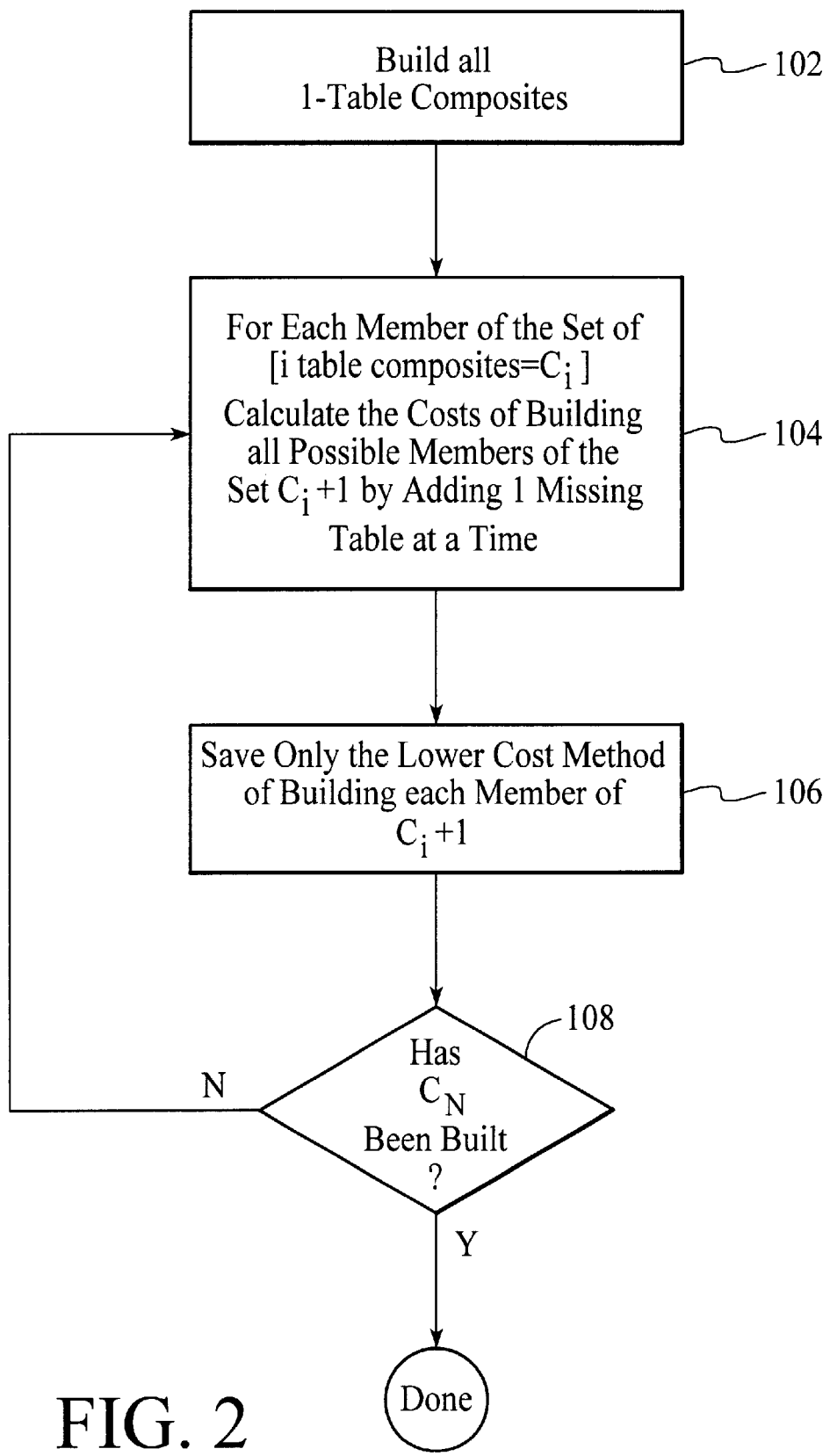
FIG. 2 is a flow chart of a conventional join algorithm.

$C_i$=members of the present composite $C_i+1$=members of the next composite $C_N$=the single-member of the N table composite set FIG. 2 is a flow chart illustrating a conventional dynamic programming algorithm for joining tables. In such an algorithm, the first task is to build all one table composites, via step 102. Thereafter, for each member of the set of one table composites, the cost of building or calculating for all possible members of the set $C_i+1$ or in this case members of the 2 table composite by adding one missing table at a time, via step 104. Thereafter, the lowest cost method of building each member of $C_i+1$ and the plan is saved, via step 106. Then it is $C_i+1$ by adding one missing table at a time is calculated, via step 104. Thereafter, only the lowest cost method of building each member of the $C_i+1$ or 2 table composites, via step 106, is provided. Then, once again it is determined if in the above example a 4 table join has been built, via step 108. If the answer is no, steps 104 and 106 are repeated until the build join operation is completed.

The problem with this type of algorithm is that the cost of determining the best permutation can be very expensive in terms of CPU time, storage, and elapsed time, particularly when the number of tables becomes larger. The long elapse times can have a very large impact when the analysis is performed as part of a query submission. Accordingly, what is required is a system that reduces the expense of determining the optimum join permutation. It is important that the processor storage is minimized as well as minimizing the amount of time to obtain the optimum permutation.

The present invention is an improvement on the existing dynamic programming algorithm for joining tables. In the present invention, the costs of building a given composite are compared to a threshold. The threshold is determined by choosing a minimum cost composite from all the composites which have i tables in them. The costs of adding each missing table, one at a time, to this composite are calculated until the full N-table composite has been "built". The minimum cost of building the N-table composite is the threshold value. The threshold value is recalculated each time the successively larger set of composite tables has been built. If any new calculation results in a lower threshold value, the newer value replaces the current threshold value. In so doing the number of composites to be examined are minimized.

To more particularly describe the features of the present invention, refer now to the following discussion in conjunction with the accompanying Figures.

Figure 3:
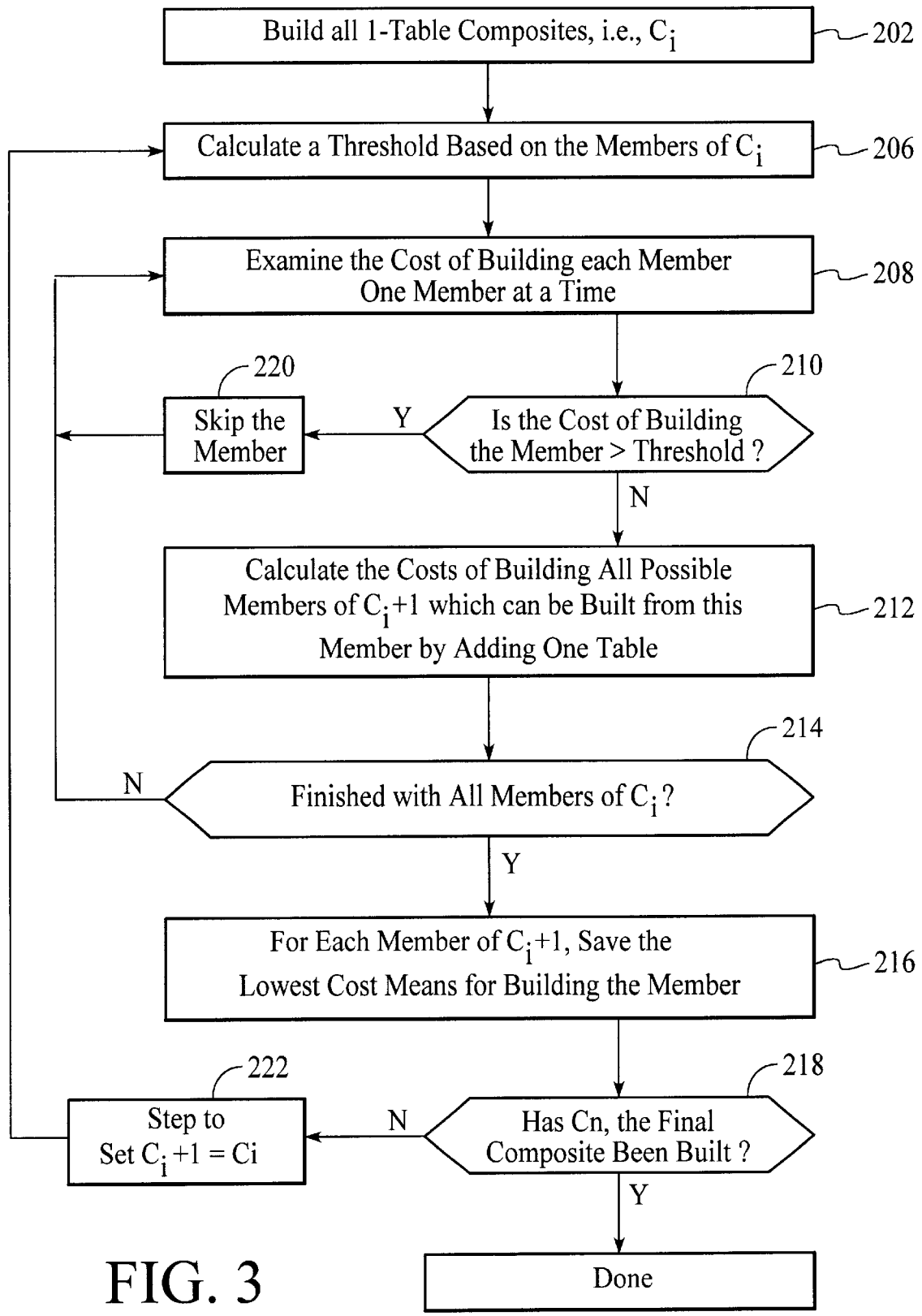
FIG. 3 is a flow chart of a join algorithm in accordance with the present invention.

FIG. 3 is a flow chart illustrating a join operation in accordance with the present invention. In the present invention, first, all 1 table composites are built, via step 202. Thereafter, a threshold is calculated, based on the members of $C_i$, via step 206.

Figure 4:
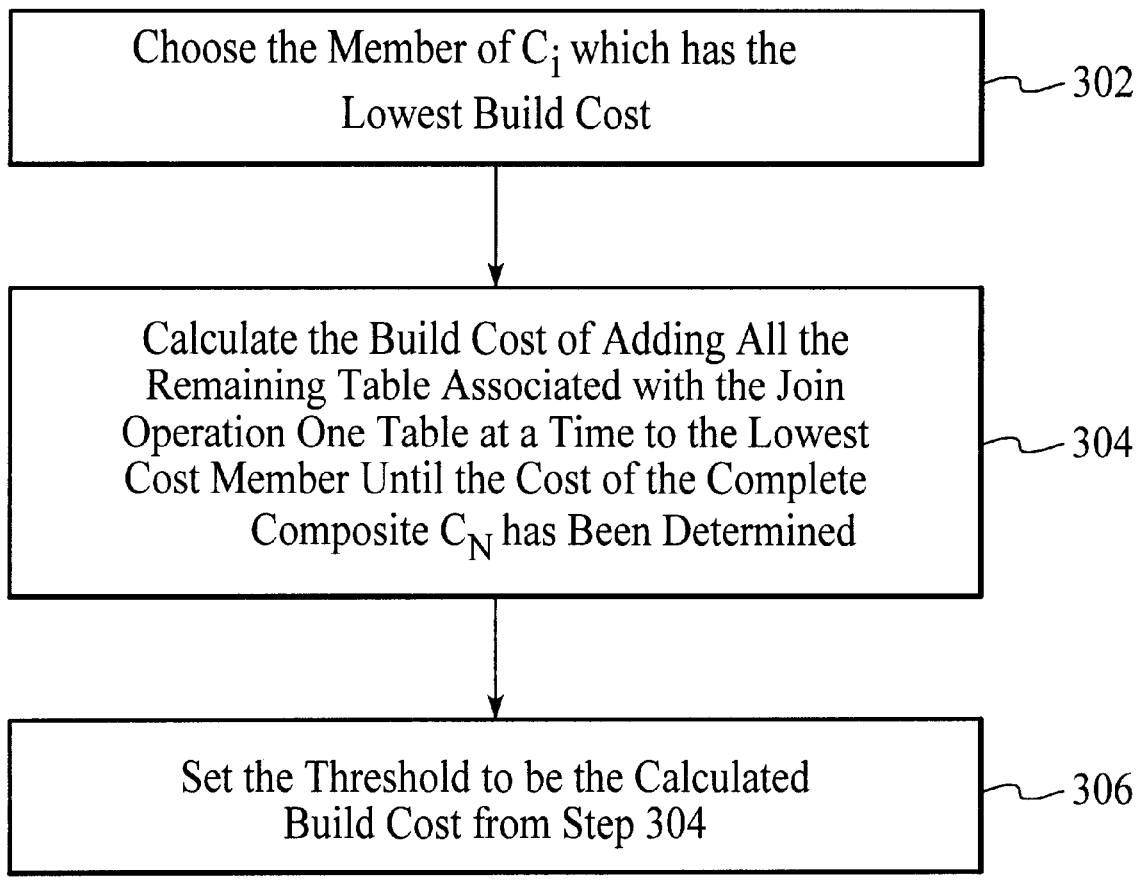
FIG. 4 is a flow chart illustrating calculating a threshold value in accordance with the present invention.

A key element of the present invention is calculating a threshold value for limiting the number of composites that have been analyzed. Referring now to FIG. 4, what is seen is a system for calculating the threshold value. First, the member $C_i$ which has the lowest build cost associated with it is chosen, via step 302. Next, the build cost of adding the remaining tables one table at a time, is calculated, via step 304. Next, the threshold is set to the build cost, via step 306.

Referring back to FIG. 3, after the threshold is determined, via step 206, the cost of building each member of $C_i$ is examined one member at a time, via step 208. Then it is determined if the cost of building each member within $C_i$ is greater than the threshold, via step 210. If a cost for a member is greater, that member is skipped, via step 220, and the next member of $C_i$ is considered, via step 208. If it is determined that the cost of building a particular member is not greater than the threshold, via step 210, then the cost for building all possible members of the next successively larger composite ($C_i+1$) by adding one table at a time is determined, via step 212.

Then, it is determined whether all members of $C_i$ that have passed the threshold have been calculated, via step 214.

Thereafter, the lowest cost for building each of the members is saved, via step 216. Then it is determined whether ($C_N$) the final composite has been built, via step 218. If it has been built, then the process is finished, via step 221. If the final composite has not been built, then the next higher resultant composite is provided ($C_i+1$), and return to step 204.

As is seen, if any new calculation results in a lower threshold value, that replaces the previous threshold value. A significant property of the algorithm is that if tables listed in the FROM clause are listed in the order which approximate the final solution, the threshold values calculated will often be lower, and the resulting calculation time and resources will be less.

A method and system for calculating the lowest cost join permutation for queries which involve multiple tables is disclosed. In a system and method in accordance with the present invention, the costs of building the given composite is compared to a threshold. The threshold is determined by choosing a minimum cost composite from all the composites which have N tables in them. The costs of adding each missing table, one at a time, to this composite are calculated until the full N-table composite has been "built". The minimum cost of building the N-table composite is the threshold. The threshold value is recalculated each time the successively larger set of composite tables has been built. If any new calculation results in a lower threshold value, the newer value replaces the current threshold value. In so doing less computation time is required to optimize the joining process. Accordingly, CPU storage time and elapsed time are significantly reduced utilizing a system and method in accordance with the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for determining the lowest cost permutation for joining database tables comprising the steps of:
    (a) determining the cost of building each member of an initial set of composites one table at a time;
    (b) calculating the cost of building all possible members of the next successively larger set of composites which can be built from members which do not exceed a threshold value;
    (c) saving the lowest cost for building each member of the next composites;
    (d) determining if a final composite has been built;
    (e) stepping to the next successively larger set of composites if the final composite has not been built; and
    (f) repeating steps (a)–(e) until the final composite has been built.

2. The method of claim 1 wherein the threshold value is determined by choosing the member of a composite which has the lowest build cost; and calculating the build cost of adding the remaining tables associated with the join operation one table at a time to the lowest cost member, wherein the threshold value is set to be the calculated build cost of the lowest cost member.

3. The method of claim 2 wherein the threshold value is updated as successively larger composites are built.

4. A method for calculating a threshold value of a composite in which the number of members which must be evaluated in a join operation is minimized, the method comprising:
    (a) choosing the member of the composite which has the lowest build cost;
    (b) calculating the build cost of adding the remaining tables associated with join operation one table at a time to the lowest cost member; and
    (c) setting the threshold value to be the calculated build cost of the lowest cost member, wherein the threshold value is updated as successively larger composites are built.

5. A computer readable medium containing program instructions for determining the lowest cost permutation for joining database tables, the program instructions for:
    (a) determining the cost of building each member of an initial set of composites one table at a time;
    (b) calculating the cost of building all possible members of the next successively larger set of composites which can be built from members which do not exceed a threshold value;
    (c) saving the lowest cost for building each member of the next composites;
    (d) determining if a final composite has been built;
    (e) stepping to the next successively larger set of composites if the final composite has not been built; and
    (f) repeating instructions (a)–(e) until the final composite has been built.

6. The computer medium readable of claim 5 wherein the threshold value is determined by the choosing the member of a composite which has the lowest build cost; calculating the build cost of adding the remaining tables associated with the join operation one table at a time to the lowest cost member, wherein the threshold value is set to be the calculated build cost of the lowest cost member.

7. The computer readable medium of claim 6 wherein the threshold value is updated as successively larger composites are built.

8. A computer readable medium containing program instructions for calculating a threshold value of a composite in which the number of members which must be evaluated in a join operation is minimized the program instructions for:

choosing the member of the composite which has the lowest build cost;

calculating the build cost of adding the remaining tables associated with join operation one table at a time to the lowest cost member; and setting the threshold value to be the calculated build cost of the lowest cost member, wherein the threshold value is updated as successively larger composites are built.

9. A system for determining the lowest cost permutation for joining database tables comprising:

means for determining the cost of building each member of an initial set of composites one table at a time;

means for calculating the cost of building all possible members of the next successively larger set of composites which can be built from members which do not exceed a threshold value;

means for saving the lowest cost for building each member of the next composites;

means for determining if a final composite has been built; and means for stepping to the next successively larger set of composites if the final composite has not been built.

10. The system of claim 9 wherein the threshold value is determined by choosing the member of a composite which has the lowest build cost; and calculating the build cost of adding the remaining tables associated with the join operation one table at a time to the lowest cost member, wherein the threshold value is set to be the calculated build cost of the lowest cost member.

11. The system of claim 9 wherein the threshold value is updated as successively larger composites are built.

12. A system for calculating a threshold value of a composite in which the number of members which must be evaluated in a join operation is minimized, the system comprising:

means for choosing the member of the composite which has the lowest build cost;

means for calculating the build cost of adding the remaining tables associated with join operation one table at a time to the lowest cost member; and means for setting the threshold value to be the calculated build cost of the lowest cost member, wherein the threshold value is updated as successively larger composites are built.

* * * * *